United States Patent
Chapman et al.

(10) Patent No.: US 12,400,262 B2
(45) Date of Patent: *Aug. 26, 2025

(54) CUSTOMIZABLE MACRO-BASED ORDER ENTRY PROTOCOL AND SYSTEM

(71) Applicant: Nasdaq, Inc., New York, NY (US)

(72) Inventors: Michael Chapman, New York, NY (US); Michael Lazarev, Hoboken, NJ (US); John Vaccaro, New York, NY (US)

(73) Assignee: NASDAQ, INC., New York, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/992,097

(22) Filed: Nov. 22, 2022

(65) Prior Publication Data

US 2023/0083796 A1    Mar. 16, 2023

Related U.S. Application Data

(63) Continuation of application No. 16/803,087, filed on Feb. 27, 2020, now Pat. No. 11,562,427, which is a continuation of application No. 14/840,820, filed on Aug. 31, 2015, now Pat. No. 10,607,289, which is a continuation of application No. 14/055,205, filed on Oct. 16, 2013, now Pat. No. 9,123,076.

(51) Int. Cl.
*G06Q 40/00* (2023.01)
*G06Q 40/04* (2012.01)

(52) U.S. Cl.
CPC .................................. *G06Q 40/04* (2013.01)

(58) Field of Classification Search
CPC ..................................................... G06Q 40/04
See application file for complete search history.

(56) References Cited

U.S. PATENT DOCUMENTS

| | | | |
|---|---|---|---|
| 4,882,475 A | 11/1989 | Miller et al. | |
| 4,935,870 A | 6/1990 | Burk et al. | |
| 5,787,405 A * | 7/1998 | Gregory | G06Q 40/128 705/40 |
| 5,893,911 A * | 4/1999 | Piskiel | G06N 5/046 707/694 |
| 6,047,045 A | 4/2000 | Bauer et al. | |
| 6,331,855 B1 | 12/2001 | Schauser | |
| 6,876,982 B1 * | 4/2005 | Lancaster | G06Q 40/00 705/37 |

(Continued)

OTHER PUBLICATIONS

High Frequency Trading Acceleration Using FPGAs, IEEE (Year: 2011).*

(Continued)

*Primary Examiner* — Bruce I Ebersman

(74) *Attorney, Agent, or Firm* — Nixon & Vanderhye PC

(57) ABSTRACT

The present technology is related to employing a template/macro-based order entry system. An initial order data message contains a macro that establishes the initial parameters for an order and a unique ID is associated with the template. Subsequent, and potentially smaller sized data messages contain the unique ID as well as relevant order details for placing an order. Of course, the technology described herein envisions a much broader concept of reducing message sizes to help improve overall latency and is not limited to order entry.

16 Claims, 5 Drawing Sheets

(56) References Cited

U.S. PATENT DOCUMENTS

| | | | |
|---|---|---|---|
| 7,043,363 B2 | 5/2006 | Yamamoto | |
| 7,464,055 B2* | 12/2008 | Kelly | G06Q 40/00 705/37 |
| 7,546,456 B2* | 6/2009 | Le | H04W 12/122 713/153 |
| 7,620,584 B2 | 11/2009 | Lynn et al. | |
| 7,746,250 B2 | 6/2010 | Nanda et al. | |
| 7,840,483 B2* | 11/2010 | Youngren | G06Q 40/04 705/37 |
| 8,005,902 B2 | 8/2011 | Cameron | |
| 8,131,883 B1 | 3/2012 | Reisman | |
| 8,229,820 B2 | 7/2012 | Newell et al. | |
| 8,385,248 B2* | 2/2013 | Sung | H04W 4/06 370/312 |
| 8,626,763 B1* | 1/2014 | Wolfe | G06F 16/9535 707/706 |
| 8,660,936 B1* | 2/2014 | Banke | G06Q 40/04 340/568.1 |
| 8,751,364 B2 | 6/2014 | Gaber et al. | |
| 8,762,249 B2* | 6/2014 | Taylor | G06Q 40/00 705/37 |
| 9,123,076 B2* | 9/2015 | Chapman | G06Q 40/04 |
| 2002/0046151 A1* | 4/2002 | Otero | H04W 4/00 705/37 |
| 2002/0070915 A1* | 6/2002 | Mazza | G06Q 40/04 345/156 |
| 2002/0130868 A1* | 9/2002 | Smith | G06Q 40/04 345/440 |
| 2002/0174010 A1 | 11/2002 | Rice | |
| 2002/0184170 A1* | 12/2002 | Gilbert | G06F 16/958 707/E17.116 |
| 2003/0041063 A1* | 2/2003 | Brady | G06Q 40/03 |
| 2003/0093554 A1* | 5/2003 | Wolfe | G06Q 30/02 709/223 |
| 2003/0187761 A1* | 10/2003 | Olsen | G06Q 40/00 707/999.107 |
| 2004/0059666 A1* | 3/2004 | Waelbroeck | G06Q 40/04 705/37 |
| 2004/0153382 A1* | 8/2004 | Boccuzzi | H04M 15/73 705/34 |
| 2004/0210511 A1* | 10/2004 | Waelbroeck | G06Q 40/04 705/37 |
| 2005/0027635 A1* | 2/2005 | Monroe | G06Q 20/10 705/37 |
| 2005/0108141 A1* | 5/2005 | Farrell | G06Q 40/04 705/37 |
| 2007/0094329 A1 | 4/2007 | Cameron | |
| 2008/0288889 A1* | 11/2008 | Hunt | G06Q 30/02 715/810 |
| 2009/0198520 A1* | 8/2009 | Piovanetti-Perez | G06Q 10/087 705/26.1 |
| 2009/0198761 A1 | 8/2009 | Nanda et al. | |
| 2010/0076884 A1 | 3/2010 | Lutnick et al. | |
| 2010/0094743 A1 | 4/2010 | Robertson et al. | |
| 2010/0106636 A1 | 4/2010 | Lutnick et al. | |
| 2010/0332371 A1 | 12/2010 | Jensen et al. | |
| 2011/0016032 A1* | 1/2011 | Newell | H04L 51/18 705/35 |
| 2011/0282640 A1* | 11/2011 | Mohalik | G06F 30/3323 703/17 |
| 2012/0130919 A1 | 5/2012 | Gaber et al. | |
| 2012/0271748 A1* | 10/2012 | DiSalvo | G06Q 40/04 705/37 |
| 2012/0284158 A1 | 11/2012 | Kovac | |
| 2013/0238487 A1* | 9/2013 | Biske | G06Q 40/02 705/39 |
| 2013/0268420 A1* | 10/2013 | Ong | G06Q 40/00 705/35 |
| 2013/0275285 A1 | 10/2013 | Venkataraman | |
| 2013/0325687 A1 | 12/2013 | Lavalle | |
| 2014/0006244 A1* | 1/2014 | Crowley | G06Q 40/04 705/37 |
| 2014/0129405 A1 | 5/2014 | White et al. | |
| 2014/0164165 A1 | 6/2014 | Furuichi | |
| 2014/0270463 A1* | 9/2014 | Narendra | H04L 63/04 382/137 |
| 2014/0289094 A1 | 9/2014 | Gaber et al. | |
| 2015/0073967 A1 | 3/2015 | Katsuyama et al. | |
| 2015/0081508 A1 | 3/2015 | Schwall et al. | |
| 2015/0097879 A1* | 4/2015 | Reeves | G09G 3/344 345/694 |
| 2015/0106248 A1* | 4/2015 | Chapman | G06Q 40/04 705/37 |
| 2022/0156831 A1* | 5/2022 | Peck-Walden | G06Q 30/0201 |

OTHER PUBLICATIONS

Streaming, low-latency communication in on-line trading systems, IEEE (Year: 2010).*

High Frequency Trading Acceleration Using FPGAs, IEEE 2011 (Year: 2011).*

Streaming, low-latency communication in on-line trading systems, IEEE 2010 (Year: 2010).*

PCT International Search Report for PCT/SE2014/051220 dated Jan. 29, 2015.

PCT Written Opinion of the International Searching Authority for PCT/SE2014/051220 dated Jan. 29, 2015.

Fu et al., Automatically Generating Highly Customized Excel® Reports with SAS/Macro® and Integration Technologies (DDE), SAS Global Forum 2011, Paper 003-2011 (11 pgs.).

Patent Examination Report in Australian Application No. 2014337424 dated Jun. 9, 2016.

Automatic Generating Highly Customized Excel Reports with SAS/Macro Forum 2011 (Year: 2011).

Streaming, Low-Latency Communication in Online Trading System IEEE 2010 (Year: 2010).

* cited by examiner

FIG. 2A

| TID | SF1 | SF2 | SFn | VF1 | VF2 | VFn |
|---|---|---|---|---|---|---|

FIG. 2B

| TID | SF1 | SF2 | SF3 | VF1 | VF2 |
|---|---|---|---|---|---|
| 43 | NDAQ | 100 | IOC | SIDE | PRICE |

FIG. 2C

| TID | VF1 | VF2 | VFn |
|---|---|---|---|

FIG. 2D

| TID | VF1 | VF2 |
|---|---|---|
| 43 | BUY | 29.50 |

| TID | VF1 | VF2 |
|---|---|---|
| 43 | BUY | 29.55 |

| TID | VF1 | VF2 |
|---|---|---|
| 43 | SELL | 29.60 |

| TID | VF1 | VF2 |
|---|---|---|
| 43 | SELL | 29.65 |

CUSTOMIZABLE MACRO-BASED ORDER ENTRY PROTOCOL AND SYSTEM

CROSS-REFERENCE TO RELATED APPLICATION

This application is a continuation U.S. patent application Ser. No. 16/803,087, filed Feb. 27, 2020, which is a continuation of U.S. patent application Ser. No. 14/840,820 filed Aug. 31, 2015 (now U.S. Pat. No. 10,607,289), which is a continuation of U.S. patent application Ser. No. 14/055,205 filed Oct. 16, 2013 (now U.S. Pat. No. 9,123,076). The entire contents of each of these applications are incorporated by reference in their entirety.

BACKGROUND

The technology provides decreased payload, decreased latency and conservation of bandwidth by using a new and inventive protocol method and corresponding system. The technology is specifically related to order data message entry and in particular to a Macro-based order entry methodology which, among other things, allows for reduced messaging between exchange clients and an Order Port/Gateway of an exchange.

In modern distributed systems, billions of data messages are passed between separately located devices in only fractions of a second. Although modern computing devices have larger memories, faster processors, and greater broadband capabilities, there is always a need to improve upon processing efficiency and overall latency between the devices. This can be especially true for electronic exchange systems that communicate with numerous remote devices and conduct order entry and order processing on a mass scale.

Certain modern exchange systems use the OUCH Order Entry Protocol for order entry. The OUCH protocol is a proprietary NASDAQ OMX® digital communications protocol that allows customers of electronic exchange providers to conduct business in various electronic, financial markets. With OUCH, subscribers can place, execute, or cancel orders. OUCH moreover allows subscribers to integrate electronic exchange services into their proprietary networks, giving a rather high degree of seamlessness. OUCH is a low-level, native protocol designed for high performance and minimal latency. In order to achieve optimum functional efficiency and speed, some flexibility is sacrificed.

The OUCH protocol passes logical messages, of a specific length, between the host (i.e., exchange) and the client (i.e., trader) application. All data messages sent to the host can be retransmitted in the event of a temporary hardware failure or software error. By connecting a single OUCH account to more than one machine, redundancy and fault tolerance are achieved. Moreover, OUCH ensures that data messages from customers (brokers/traders/members) are processed in the same sequence as they are received. Each new order contains a token specifying the date and the name of the account. Once a token has been used it automatically expires so it cannot be used again. When an order has been placed, executed, or canceled, and the action has been accepted by the host, an acknowledgment data message is sent to the client.

Inbound (client-to-host) messages can include, but are not limited to, the following types: Order entry, Cross order entry and Order cancellation entry. Outbound (host-to-client) messages can be more diverse, including, but not limited to: Start of day, End of day, Time stamp, Order request, Order acceptance, Order rejection, Order execution, Cancel pending, Cancel rejection, Order cancellation, Broken trade and Price correction.

The OUCH protocol is composed of logical messages passed between the OUCH host, and client applications. Each message type has a fixed message length and all messages are composed of fixed length. The data types used are numeric fields, which comprises a string of ASCII-coded digits, right-justified and zero-filled on the left; and alpha fields, which are left-justified and padded on the right with spaces.

A new order message, entered via OUCH, must specify all required fields, and the Order Entry Port must parse and validate every one of those fields. It is commonly the case that users of OUCH and similar order entry protocols (for example, the FIX protocol) will submit a series of messages that are identical except for a small subset of available fields. This duplicated information must be carried over communications infrastructure, managed by hardware in Exchange data centers, and processed by Exchange systems. With the available conventional technology, there is no way to avoid the transmission of this duplicative information by a user, and moreover, the Exchange has no way to avoid processing it. Thus, there is a need for a system that can reduce submission of duplicate information while improving latency between separate devices.

BRIEF SUMMARY

The present technology addresses these problems by using a template/macro-based order entry system. An initial order data message contains a macro that establishes the initial parameters for an order and a unique ID is associated with the macro. Subsequent, and potentially smaller sized data messages contain the unique ID as well as relevant order details for placing an order. Of course, the technology described herein envisions a much broader concept of reducing message sizes to help improve overall latency and is not limited to order entry.

BRIEF DESCRIPTION OF THE DRAWINGS

FIGS. 2A-D depict example diagrams of order data messages and respective contents of the order data messages;

DETAILED DESCRIPTION OF THE TECHNOLOGY

Figure 1:
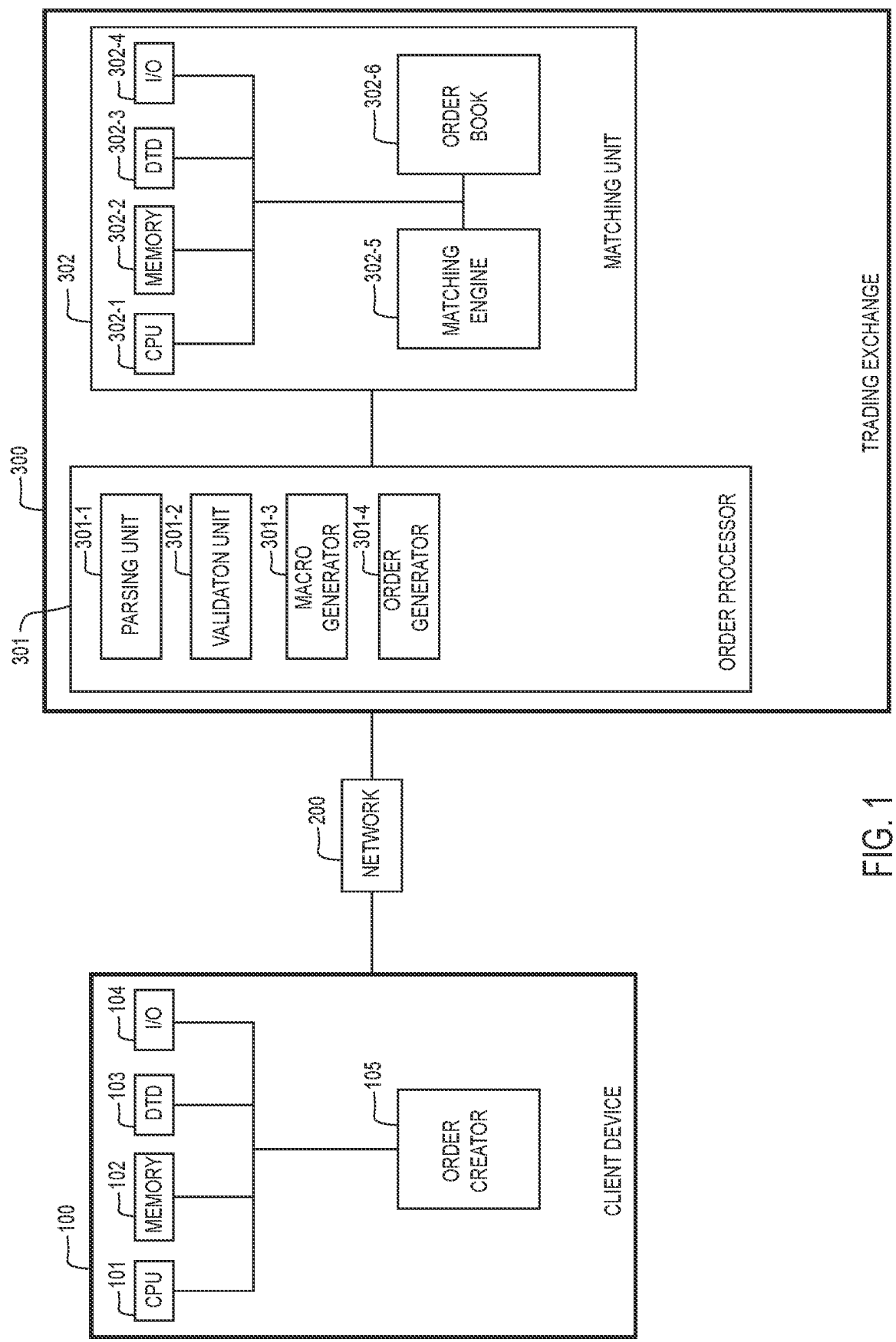
FIG. 1 is an example function block diagram of an exchange system.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on non-transitory computer-readable storage medium and when the instructions are executed by a computer or other suitable processor control, the computer or processor performs the functions. Although databases may be depicted as tables below, other formats (including relational databases, object-based models and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Various forms of computer readable media may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways well known in the art.

Example components of a Macro Based Order Entry Protocols can include a macro definition message which is a message that instructs the system to define values for static fields and or a sequence of order management messages that will be subsequently inferred by the system. Another component includes a macro definition validation system that validates that macro orders have static values and/or the sequence of messages that can be sensibly accepted by the system. This system could, for example, be integrated into an order entry port. It should also be appreciated that the macro can also be referred to as a template.

The system also includes a macro definition acknowledgement which is a message sent by the system to alert the user of the successful initialization of the macro, and the identifying information for that macro as assigned by the system. Included also is a macro which contains values for static fields and/or a sequence of order management actions defined by a Macro definition message together with its identifying information as stored and recognized by the system.

The system also includes a macro order message which is a message containing instructions relating to an actual order, including a reference to a Macro via its identifying information as well as relevant non-static information that is required to successfully generate a valid order and/or sequence of events per the underlying protocol. The system also includes a macro order message interpreter which is a system for generating appropriate order management actions based on the combined specifications of the macro and the macro order message.

Users can interact with the Macro Based Order Entry Protocol System first by submitting a Macro definition message which is validated by the System. The validation is both of content (such as validating that the broker submitting the message is entitled to do so), and also validating that the submitted order is allowed for trading (e.g., by verifying trading limits are not reached). Upon successful processing, a macro is created and acknowledged to the user. Subsequently, the user may submit a Macro order message (which is substantially smaller in size relative to traditional order messages) that is interpreted by the system using the information made available by the macro's definition and additional non-static information included on the Macro order message. In this way, the system would be able to avoid processing (e.g. parsing validation) static fields each time Macro orders are received and improves greatly the operating efficiency of Exchange systems by reducing the amount of data that must be processed per transaction.

These macros may remain active for as long as the user determines to allow them to exist, or as long as the system has been configured to allow them to exist. The Macro Based Order Entry Protocol and System is provided for efficient communication and processing of incoming, or internally routed, client orders. The submitted macro may relate to a message or series messages for placing orders, cancelling orders, modifying orders, replacing orders, etc. or any combination thereof, in financial products including but not limited to equities, options, and/or derivative products. The macro structure allows for user customization or definition of the static portion of the order entry instruction (order type, symbol, time in force, etc.) which is parsed, validated, and initialized only subsequent to the definition of the macro by the user. Each use of the macro must specify only the non-static portion of the order entry instruction (side, price, etc.) allowing for expedited parsing, validation and processing by any components in the system.

The below-described non-limiting example uses a Pseudo Protocol to describe the communicated messages. The actual protocol can be represented in binary format. The System in the example may represent a Matching Engine, an Order Router, OMS, EMS, or any other node or component in an exchange system involved in processing or otherwise handling orders.

A user node (e.g., trader/broker/member) transmits a Macro definition data message with an instruction to create a macro, specifying all of the static portions of the order and/or the desired series of order management actions to be represented by the order. An order port processes the message in which the processed message would be passed to the system. In this example, the user sets a macro to send an order for 100 shares of NDAQ® with a time in force of Immediate or Cancel. An example of the order could be represented as:

MACRO_CREATE LIMIT_ORDER [SIDE] NDAQ 100 [PRICE] IOC

The Order Port, which includes a Macro definition message validation system, receives, parses and validates all of the Static Fields in the message for valid Order Type, Symbol, Order Size, and Time In Force. Once validated, the Order Port forwards the Macro definition message or materially the same information to the order processing system, in this example an Exchange matching engine.

The System receives the information from the order entry port, and creates an object representing the macro and sends a Macro definition acknowledgement to the user about the successfully allocated Macro. A Macro ID will be unique on a per user basis and an example of the acknowledgment could be represented as:

MACRO_CREATE_SUCCESS MACRO_ID=43

For each subsequent actual order, the client (e.g., trader/broker/member) submits a Macro order message to the order port, referencing the previously created macro, specifying just the variable portions of the order entry instruction. For example, the subsequent order data messages could be represented as:

MACRO_ORDER TEMPLATE_ID=43 BUY 29.50
MACRO_ORDER TEMPLATE_ID=43 SELL 29.60
MACRO_ORDER TEMPLATE_ID=43 BUY 29.55
MACRO_ORDER TEMPLATE_ID=43 SELL 29.65

The Order Port receives, parses, and validates only the variable fields in the context of the static order entry instructions. In the present example, the Order Port does not need to validate the Order Type, Symbol, Order Size or Time In Force, and only needs to check the Side and Price of the order. Once valid, Order Port forwards the information to the System.

The system receives the macro order, looks up the object containing the previously initialized static values, updates it with variable values and processes the object as it would otherwise. If, as in the present example, the system represents a Matching Engine, it would process the incoming Macro Order by combining the static-information contained in the appropriate Macro with the non-static information on the Macro Order and process this complete message as though it were a traditional message containing explicit instructions for each of the required fields.

Figure 5:
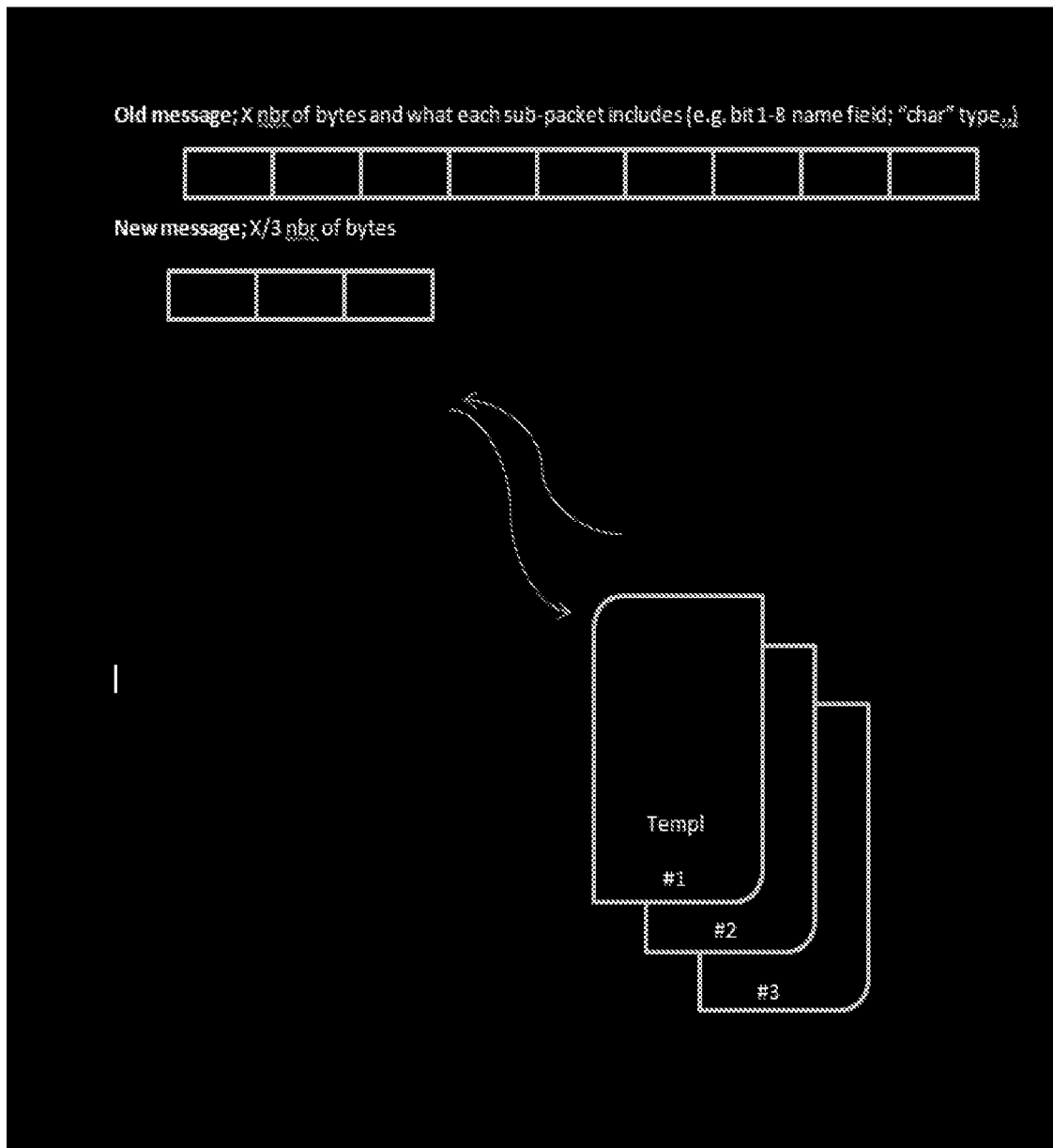
FIG. 5 is an example of contrasting message types.

In an example implementation of the macro system, a client (e.g., trader/broker/member) may submit up to 256 unique macros (or templates) that define a set of static values such as symbol, TIF, Firm, Display, Capacity and a set of variable values such as side, size, price, etc. Each subsequent Order Entry Command may be as small as 4 bytes; i.e. message type (1 byte), template Id (1 byte) and quantity (2 bytes) and price (2 bytes). The Order Entry port will only validate the template itself, consequently there will be minimal validation required for each subsequent Macro Order, with the exception of checks that, by their nature, must be done by the system for each processed order in order to allow for correct execution of the transaction, for example, in the case of US Equities price checks done for purposes of complying with Regulation National Market System (NMS), Regulation Shortsale Handling Obligations (SHO), etc. An illustrative example of the contrasting message types is illustrated in FIG. 5.

This present technology enables users of Exchange or Exchange-like systems to instruct these systems to generate complete order management instructions from a combination of pre-defined static instructions that need only be submitted once and instructions that are variable on an order by order basis. This technology has to potential to greatly reduce the costs of trading for nearly all securities, most immediately those that have already migrated to electronic Exchange platforms.

By providing all of the static components of order entry instruction in advance (especially during non-market trading hours), the system is utilized in processing and validating all of the required fields only once per macro. Furthermore, communications of variable components of order entry instruction are not only smaller in size (thus reducing bandwidth consumption), but also bypass previous static field validation routines, allowing for faster processing and determination execution path within an application. As an example, inbound client message size can be substantially reduced (to the extent that static fields are predefined by the user, meaning this information would no longer need to be transmitted) and also client message quantity will be reduced to the extent that the macro represents a series of actions which would otherwise need to be independently undertaken by the user.

FIG. 1 is an example function block diagram of an exchange system. A computer-implemented exchange system 300 can be coupled via a network 200 to a client system 100 configured to create and place orders with the exchange 300. The client system 100 can be implemented with and/or used via a personal computer, a PDA device, a cell phone, a server computer, or any other system/device for conducting the electronic exchange described herein. The client system 100 can be any individual and/or business entity conducting electronic trading with the exchange. The exchange system 300 communicates with a plurality of client systems 100 to match orders.

The client system 100 includes a central processing unit (CPU) 101, a memory 102, a data transmission device 103, and an input/output (I/O) interface 104. The data transmission device (DTD) 103 can be, for example, a network interface device that can connect the client system 100 to the network 200. The connection can be wired, optical, or wireless and can connect over a Wi-Fi network, the Internet, or a cellular data service, for example. The data transmission device 103 is capable of sending and receiving data (i.e., a transceiver), such as order data messages created by an order creator 105. The I/O interface 104 can be, for example, a physical interface for communicating data, including, but not limited to an optical disc drive, a USB interface, and/or a memory stick interface. The client system 100 can be used for conducting exchange with the exchange system 300. The client system 100 can take an order from a user, created via the order creator 105, for a derivative instrument, send it to the exchange system 300, and the exchange system 300 can attempt to match the order.

The exchange system 300 includes an order processor 301 and a matching unit 302. The order processors includes a parsing unit 301-1 for parsing order data messages sent from the client device 100 and a validation unit 301-2 for validating the parsed order data messages. The order processor also includes a macro (or template) generator 301-3 that can generate a macro/template for order entry where subsequent orders can use a unique ID generated from the macro generator 301-3 for processing orders. The order processors 301 also includes an order generator 301-4 that can generate an order using the unique ID contained in the subsequent orders and matching that information with a template.

The matching unit 302 includes a CPU 302-1, a memory 302-2, a data transmission device 302-3, and an input/output (I/O) interface 302-4. In an example embodiment, the exchange system 300 may include multiple processors and/or memories and may be designed for fail-safe redundancy. The data transmission device (DTD) 302-3 can be, for example, a network interface device that can connect the exchange 300 to the network 200, and is capable of sending and receiving data (i.e. a transceiver). The I/O interface 302-4 can be, for example, a physical interface for communicating data, including, but not limited to an optical disc drive, a USB interface, and/or a memory stick interface.

The exchange system 300 also has a matching engine 302-5, implemented using one or more processors, for matching orders and an order book memory 302-6 for storing orders. The order book 302-6 can exist in the memory 302-2 of the exchange system 300.

FIGS. 2A-D depict example diagrams of order data messages and respective contents of the order data messages. As explained above, the client device 100 can create an order data message that is submitted to an exchange system 300. An initial order data message can comprise a list of fields having different values assigned for each field. For example, the client device 100 can create an initial order for 100 shares of NASDAQ OMX® (NDAQ) with a time in force of Immediate or Cancel. Upon receiving the initial order data message, the system 300 can create a macro definition message specifying all of the static portions and variable portions of the order and assign a macro ID to the order. An example of the macro definition message and its static and variable portions are shown in FIG. 2A. The macro definition message can have a macro ID TID, one or more static fields SF1-n, and/or one or more variable fields VF1-n.

The system 300 can match the initial order data message values with the fields as shown, for example, in FIG. 2B. The example shown in FIG. 2B uses the order for 100 shares of NDAQ as discussed above, and creates a macro ID TID 43 with static fields 1, 2, and 3 corresponding to the trading name/ticker NDAQ, the number of shares 100, and the time in force of Immediate or Cancel, respectively. The variable fields 1 and 2 correspond to the side (e.g., buy, sell) and the price, respectively.

Upon creating the macro, the system can send an acknowledgement to the device 100 informing the device that the macro was successfully created and providing the device with the macro ID 43. The macro ID can be unique on a per user basis, for example.

The device 100 can then send orders referencing the macro ID and providing data in the order only for the variable fields (as the static fields are already defined by the macro). FIG. 2C shows an example of the fields contained in a subsequent order where the order will have the macro ID TID and one or more variable fields VF1-n. For example, subsequent orders associated with macro ID TID 43, shown in FIG. 2D, could be for buying shares of NDAQ for 29.50 or 29.55 per share or selling shares of NDAQ for 29.60 or 29.65 per share. FIG. 2D reflects the "shortened" order data message having only the macro ID TID and the two variable fields VF1 and VF2. Thus, the system advantageously reduces the amount of data sent in the subsequent order data messages thereby greatly improving the latency between the device 100 and system 300 as less data will be submitted with each order message.

As explained above, conventional systems would simply submit the entire order message (shown in part in FIG. 2B) for each order where the side and price would change for each message. By creating a unique macro ID TID, the subsequent orders need only reference the TID and one or more of the relevant variable fields VF1-n thereby reducing the amount of data transmitted between the device 100 and the system 300. Even though this modification may not seem as significant for a single order, the latency when processing billions of order data messages is greatly reduced by this improvement. The system 300 can also parse and validate the initial and subsequent order data messages to ensure that the proper contents of the messages are present.

Figure 3:
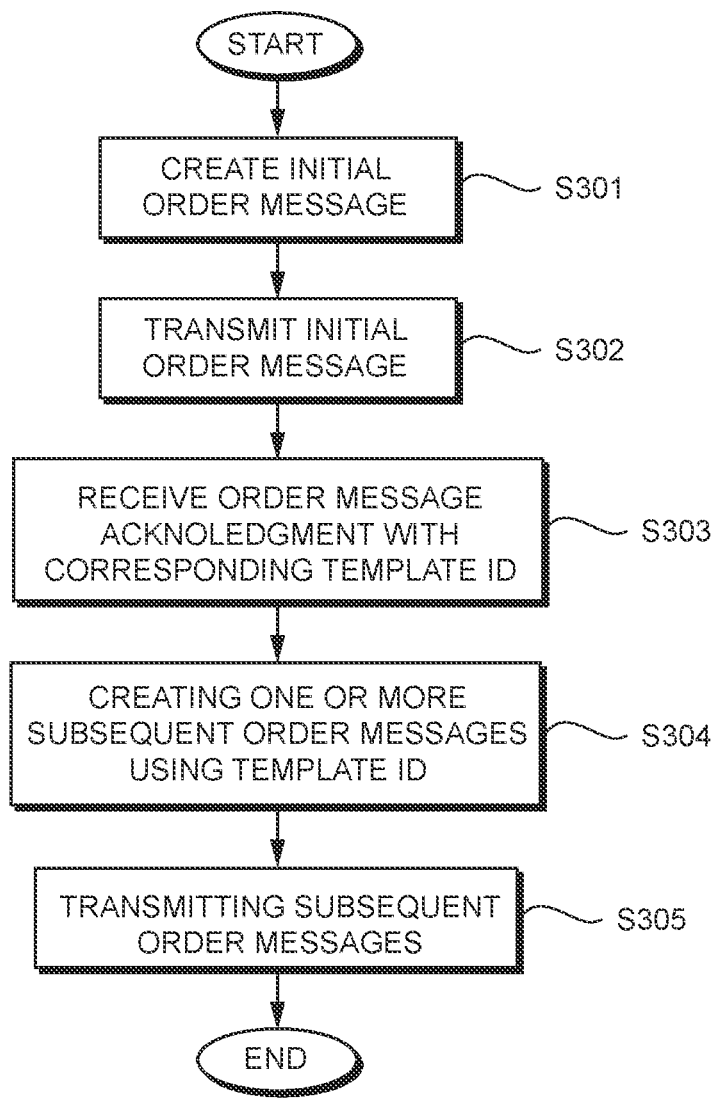
FIG. 3 is an example application flowchart for a system employing an order entry protocol structure.

FIG. 3 is an example application flowchart for a system employing an order entry protocol structure. Although not limited to this embodiment, the processes shown in FIG. 3 can be carried out by the device 100 where the device will begin process by creating an initial order data message (S301). In the example shown above, the initial order data message could be an order for 100 shares of NDAQ with a time in force of Immediate or Cancel. Upon creating this initial order data message, the system will transmit the order data message (S302) via the DTD 103 to the system 300. As described in further detail below, the system 300 can send an acknowledgement back to the device 100 and/or subsequent messages indicating the success or failure of processing/matching the order.

Upon sending the initial order data message, the device 100 will ideally receive an acknowledgement (S303) from the system 300 having a macro ID TID. The device 100 can use this macro ID in creating one or more subsequent order data messages (S304) where the TID and relevant variable fields VF1-n will be used in the subsequent order data messages. These subsequent order data messages can then be transmitted to the system 300 for matching (S305).

Figure 4:
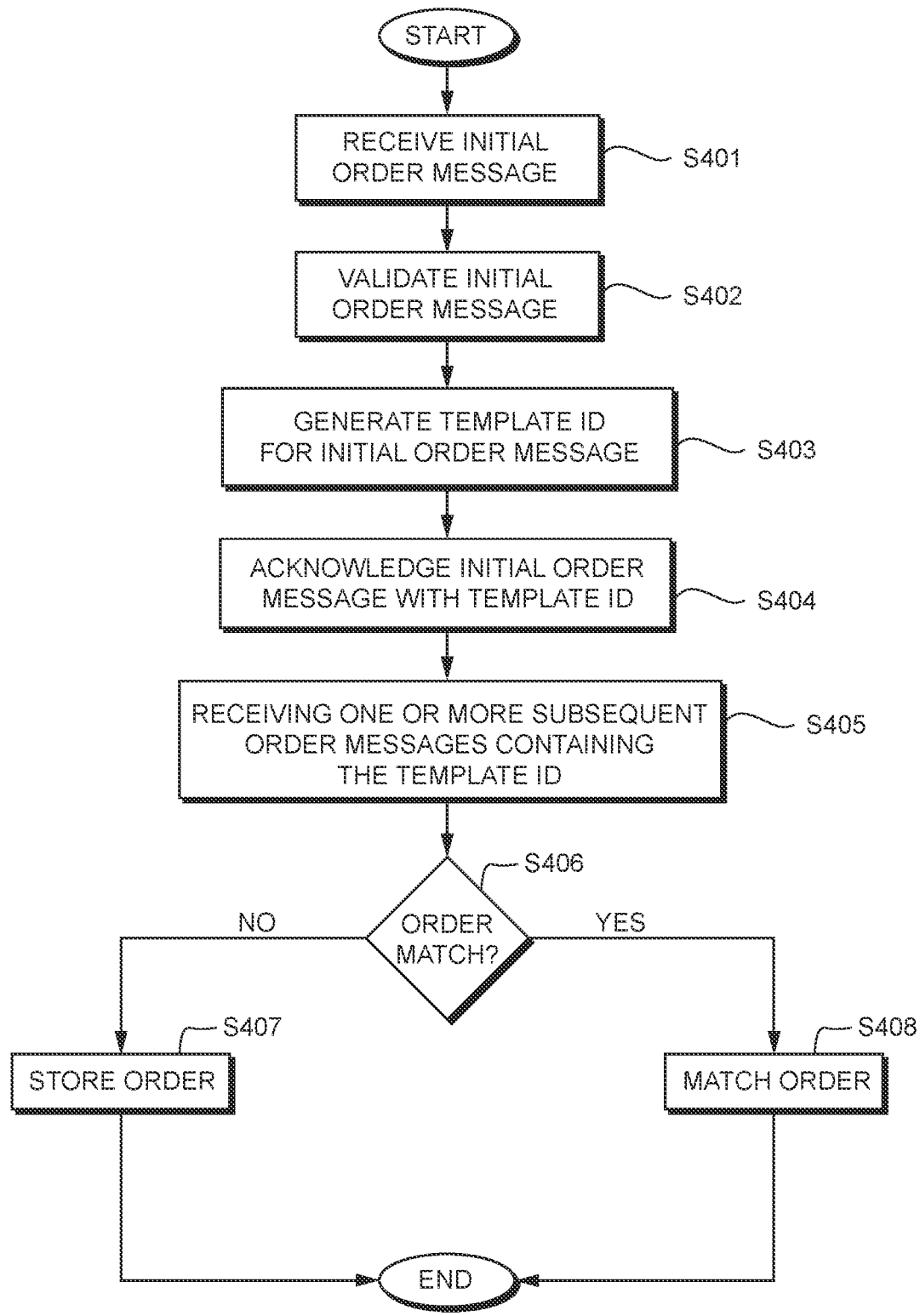
FIG. 4 is an example application flowchart for a system employing an order entry protocol structure to process the order data messages.

FIG. 4 is an example application flowchart for a system employing an order entry protocol structure to process the order data messages. Although not limited to this embodiment, the processes shown in FIG. 4 can be implemented by the system 300.

The system 300 begins by receiving the initial order data message (S401) from the device 100. Using the example from above, the initial order data message can be an order for 100 shares of NDAQ with a time in force of Immediate or Cancel. The system 300 can validate the initial order data message (S402) by parsing the order data message to ensure that the proper fields contain the proper types of data for each field. The system 300 can also validate that submission was correct (e.g., by a member of the exchange and that said member is allowed to trade at specified order volumes). For example, an order data message having a numeric value for the trading name (e.g., NDAQ) may not pass validation (unless of course there are trading names that happen to contain a numeric value). Upon successful validation the system will generate a macro ID TID for the initial order data message (S403) and then submit an acknowledgement of the initial order data message (S404) containing the macro ID TID in the message to the device 100.

The device 100 can then create subsequent order data messages that contain the macro ID TID and the system 300 will receive these messages containing the TID (S405). The system 300 can then combine the subsequent order data messages (for example, by concatenating) with the static fields in the macro. For example, a subsequent order for NDAQ having a sell designation for 29.50 per share will be combined with the macro to form an order message comprising both the static fields and variable fields resulting in the full order message of SELL NDAQ 100 29.50 IOC.

In this manner, the system can incorporate such an order management protocol without affecting the design of the exchange. That is, the order that is actually processed by the exchange will reflect a typical order, even though the message actually submitted to the exchange 300 contained less amount of information. Such an improvement increases the overall latency for order transmission and processing as less data is sent with each order while at the same time the order will appear as a normal order once it is ready for matching at the exchange. The system 300 can then attempt to match the order (S406) where the order will either match (408) or be stored in an order book (S407) for later matching.

While the technology has been described in connection with example embodiments, it is to be understood that the technology is not to be limited to the disclosed embodiments, but on the contrary, is intended to cover various modifications and equivalent arrangements.

The invention claimed is:

1. A system, comprising:
a processor; and
a memory configured to store computer readable instructions that, when executed by the processor, cause the system to:
receive a first order data message, wherein the first order data message includes:
one or more static fields;
one or more variable fields; and
a first order having static field values associated with the one or more static fields and first variable field values associated with the one or more variable fields;
generate a first order template having the one or more static fields and the one or more variable fields, wherein the one or more static fields in the first order template include the static field values;
receive a second order data message, wherein the second order data message is associated with the first order and includes second variable field values associated with the one or more variable fields;
validate the second variable field values in the second order data message;
generate a complete order by combining the static field values in the first order template with the validated second variable field values in the second order data message; and
process order data included in the complete order, wherein
combining the static field values with the second variable field values includes concatenating the static field values with the second variable field values, and
the second order data message includes fewer fields than the first order data message.

2. The system of claim 1, wherein the first order template is a macro definition message, and the macro definition message includes the one or more static fields, the one or more variable fields, and the first order having the static and first variable field values.

3. The system of claim 2, wherein the second order data message references the macro definition message using a macro identifier (ID).

4. The system of claim 3, wherein the system is further caused to transmit a data message including an acknowledgment of the received macro definition message and the macro ID.

5. The system of claim 1, wherein the system is further caused to:
parse the one or more static fields and the one or more variable fields in the first order data message; and
validate all of the one or more static fields in the first order data message.

6. The system of claim 1, wherein the first order data message and the second order data message are processed using a same protocol.

7. The system of claim 1, wherein the one or more second variable field values are validated without validating the static field values from the one or more static fields.

8. The system of claim 1, wherein the one or more static fields comprise at least one of an order type, an order symbol, and/or an order size.

9. A method for processing order data message, the method comprising:
in an information processing system having at least a processor and a memory:
receiving a first order data message, wherein the first order data message includes:
one or more static fields;
one or more variable fields; and
a first order having static field values associated with the one or more static fields and first variable field values associated with the one or more variable fields;
generating a first order template having the one or more static fields and the one or more variable fields, wherein the one or more static fields in the first order template include the static field values;
receiving a second order data message, wherein the second order data message is associated with the first order and includes second variable field values associated with the one or more variable fields;
generating a complete order by combining the static field values in the first order template with the second variable field values in the second order data message; and
processing order data included in the complete order, wherein
combining the static field values with the second variable field values includes concatenating the static field values with the second variable field values, and
the second order data message includes fewer fields than the first order data message.

10. The method of claim 9, further comprising:
validating the second variable field values in the second order data message.

11. The method of claim 10, wherein the first order template is a macro definition message, and the macro definition message includes the one or more static fields, the one or more variable fields, and the first order having the static and first variable field values.

12. The method of claim 11, wherein the second order data message references the macro definition message using a macro identifier (ID).

13. The method of claim 12, wherein the system is further caused to transmit a data message including an acknowledgment of the received macro definition message and the macro ID.

14. A non-transitory computer readable storage medium having computer readable instructions that, when executed by a processor of an information processing apparatus, cause the information processing apparatus to provide execution comprising:
receiving a first order data message, wherein the first order data message includes:
one or more static fields;
one or more variable fields; and
a first order having static field values associated with the one or more static fields and first variable field values associated with the one or more variable fields;
generating a first order template having the one or more static fields and the one or more variable fields, the one or more static fields in the first order template including the static field values;
receiving a second order data message, wherein the second order data message is associated with the first order and includes second variable field values associated with the one or more variable fields;
generating a complete order by combining the static field values in the first order template with the second variable field values in the second order data message; and processing order data included in the complete order, wherein combining the static field values with the second variable field values includes concatenating the static field values with the second variable field values, and the second order data message includes fewer fields than the first order data message.

15. The non-transitory computer readable storage medium of claim 14, wherein the information processing apparatus is caused to provide further execution comprising:

validating the second variable field values in the second order data message.

16. The non-transitory computer readable storage medium of claim 15, wherein the first order template is a macro definition message, and the macro definition message includes the one or more static fields, the one or more variable fields, and the first order having the static and first variable field values.

\* \* \* \* \*